US011336486B2

(12) United States Patent
Sharma et al.

(10) Patent No.: US 11,336,486 B2
(45) Date of Patent: May 17, 2022

(54) SELECTION OF MANAGED FORWARDING ELEMENT FOR BRIDGE SPANNING MULTIPLE DATACENTERS

(71) Applicant: Nicira, Inc., Palo Alto, CA (US)

(72) Inventors: Ankur Kumar Sharma, Mountain View, CA (US); Xiaohu Wang, Cupertino, CA (US); Hongwei Zhu, Mountain View, CA (US); Ganesan Chandrashekhar, Campbell, CA (US); Vivek Agarwal, Campbell, CA (US); Nithin B. Raju, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 38 days.

(21) Appl. No.: 16/673,658

(22) Filed: Nov. 4, 2019

(65) Prior Publication Data

US 2020/0067732 A1 Feb. 27, 2020

Related U.S. Application Data

(63) Continuation of application No. 15/813,121, filed on Nov. 14, 2017, now Pat. No. 10,511,459.

(51) Int. Cl.
*H04L 12/46* (2006.01)
*H04L 41/0893* (2022.01)
(Continued)

(52) U.S. Cl.
CPC ........ *H04L 12/4675* (2013.01); *H04L 12/462* (2013.01); *H04L 12/4666* (2013.01); (Continued)

(58) Field of Classification Search
None
See application file for complete search history.

(56) References Cited

U.S. PATENT DOCUMENTS 5,504,921 A 4/1996 Dev et al.
5,550,816 A 8/1996 Hardwick et al.
(Continued)

FOREIGN PATENT DOCUMENTS

CN 1929397 A 3/2007
CN 101232339 A 7/2008
(Continued)

OTHER PUBLICATIONS

Mahalingam et al. "Virtual extensible Local Area Network (VXLAN): A Framework for Overlaying Virtualized Layer 2 Networks over Layer 3 Networks", RFC 7348, Aug. 2014.*
(Continued)

*Primary Examiner* — Alex Skripnikov
(74) *Attorney, Agent, or Firm* — Adeli LLP

(57) ABSTRACT

Some embodiments provide a method for a set of central controllers that manages forwarding elements operating in a plurality of datacenters. The method receives a configuration for a bridge between (i) a logical L2 network that spans at least two datacenters and (ii) a physical L2 network. The configuration specifies a particular one of the datacenters for implementation of the bridge. The method identifies multiple managed forwarding elements that implement the logical L2 network and are operating in the particular datacenter. The method selects one of the identified managed forwarding elements to implement the bridge. The method distributes bridge configuration data to the selected managed forwarding element.

16 Claims, 10 Drawing Sheets

(51) Int. Cl.
  *H04L 41/0803* (2022.01)
  *H04L 12/18* (2006.01)
  *H04L 61/2592* (2022.01)
  *H04L 61/2596* (2022.01)

(52) U.S. Cl.
  CPC ...... *H04L 41/0803* (2013.01); *H04L 41/0893* (2013.01); *H04L 12/1886* (2013.01); *H04L 61/2592* (2013.01); *H04L 61/2596* (2013.01)

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,493,767 B1 | 12/2002 | Ishida et al. |
| 6,512,745 B1 | 1/2003 | Abe et al. |
| 6,539,432 B1 | 3/2003 | Taguchi et al. |
| 6,631,137 B1 | 10/2003 | Lorrain et al. |
| 6,640,251 B1 | 10/2003 | Wiget et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,215,637 B1 | 5/2007 | Ferguson et al. |
| 7,260,648 B2 | 8/2007 | Tingley et al. |
| 7,283,473 B2 | 10/2007 | Arndt et al. |
| 7,339,929 B2 | 3/2008 | Zelig et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,555,002 B2 | 6/2009 | Arndt et al. |
| 7,590,114 B1 | 9/2009 | Bishara |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,190,767 B1 | 5/2012 | Maufer et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,265,075 B2 | 9/2012 | Pandey |
| 8,281,067 B2 | 10/2012 | Stolowitz |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,341,626 B1 | 12/2012 | Gardner et al. |
| 8,351,418 B2 | 1/2013 | Zhao et al. |
| 8,370,834 B2 | 2/2013 | Edwards et al. |
| 8,401,024 B2 | 3/2013 | Christensen et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,611,352 B2 | 12/2013 | Mizrahi et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,761,152 B2 | 6/2014 | Rixner et al. |
| 8,837,281 B2 | 9/2014 | Sultan et al. |
| 8,848,508 B2 | 9/2014 | Moreno et al. |
| 8,856,518 B2 | 10/2014 | Sridharan et al. |
| 8,892,706 B1 | 11/2014 | Dalal |
| 8,923,155 B2 | 12/2014 | Qu et al. |
| 8,958,298 B2 | 2/2015 | Zhang et al. |
| 8,989,183 B2 | 3/2015 | Bansal et al. |
| 9,008,097 B2 | 4/2015 | Bloch et al. |
| 9,059,999 B2 | 6/2015 | Koponen et al. |
| 9,137,052 B2 | 9/2015 | Koponen et al. |
| 9,225,636 B2 | 12/2015 | Krishnan et al. |
| 9,246,821 B1 | 1/2016 | Li et al. |
| 9,306,837 B1 | 4/2016 | Jain et al. |
| 9,407,450 B2 | 8/2016 | Singh |
| 9,413,644 B2 | 8/2016 | Agarwal et al. |
| 9,448,821 B2 | 9/2016 | Wang |
| 9,575,782 B2 | 2/2017 | Chandrashekhar et al. |
| 9,628,294 B1 | 4/2017 | Brandwine et al. |
| 9,686,180 B2 | 6/2017 | Chu et al. |
| 9,768,980 B2 | 9/2017 | Subramaniyam et al. |
| 9,785,455 B2 | 10/2017 | Chandrashekhar et al. |
| 9,893,988 B2 | 2/2018 | Agarwal et al. |
| 9,910,686 B2 | 3/2018 | Chandrashekhar et al. |
| 9,977,685 B2 | 5/2018 | Chandrashekhar et al. |
| 10,020,960 B2 | 7/2018 | Wang et al. |
| 10,225,184 B2 | 3/2019 | Agarwal et al. |
| 10,250,443 B2 | 4/2019 | Chandrashekhar et al. |
| 10,348,625 B2 | 7/2019 | Agarwal et al. |
| 10,361,952 B2 | 7/2019 | Agarwal et al. |
| 10,374,827 B2 | 8/2019 | Wang et al. |
| 10,511,458 B2 | 12/2019 | Subramaniyam et al. |
| 10,511,459 B2 | 12/2019 | Sharma et al. |
| 10,528,373 B2 | 1/2020 | Chandrashekhar et al. |
| 10,587,514 B1 | 3/2020 | Singh et al. |
| 10,693,783 B2 | 6/2020 | Agarwal et al. |
| 11,029,982 B2 | 6/2021 | Chandrashekhar et al. |
| 11,050,666 B2 | 6/2021 | Agarwal et al. |
| 2001/0043614 A1 | 11/2001 | Viswanadham et al. |
| 2002/0013858 A1 | 1/2002 | Anderson |
| 2002/0093952 A1 | 7/2002 | Gonda |
| 2002/0194369 A1 | 12/2002 | Rawlins et al. |
| 2003/0026258 A1 | 2/2003 | Takatani et al. |
| 2003/0026271 A1 | 2/2003 | Erb et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2004/0054799 A1 | 3/2004 | Meier et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |

(56) References Cited

U.S. PATENT DOCUMENTS

| | | |
|---|---|---|
| 2005/0025179 A1 | 2/2005 | McLaggan et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0008981 A1 | 1/2007 | Pathan |
| 2007/0043860 A1 | 2/2007 | Pabar |
| 2007/0061492 A1 | 3/2007 | Riel |
| 2007/0064673 A1 | 3/2007 | Bhandaru et al. |
| 2007/0097948 A1 | 5/2007 | Boyd et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0201490 A1 | 8/2007 | Mahamuni |
| 2007/0286209 A1 | 12/2007 | Wang et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0008148 A1 | 1/2008 | Sagawa |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0069107 A1 | 3/2008 | Sofia et al. |
| 2008/0071900 A1 | 3/2008 | Hecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0181243 A1 | 7/2008 | Vobbilisetty et al. |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2008/0298274 A1 | 12/2008 | Takashige et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092043 A1 | 4/2009 | Lapuh et al. |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0144403 A1 | 6/2009 | Sajassi et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0287848 A1 | 11/2009 | Kamura et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0020726 A1 | 1/2010 | Chu et al. |
| 2010/0046531 A1 | 2/2010 | Louati et al. |
| 2010/0107162 A1 | 4/2010 | Edwards et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0208615 A1 | 8/2010 | Soon et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0287548 A1 | 11/2010 | Zhou et al. |
| 2010/0290485 A1 | 11/2010 | Martini et al. |
| 2011/0016215 A1 | 1/2011 | Wang |
| 2011/0022695 A1 | 1/2011 | Dalal et al. |
| 2011/0032830 A1 | 2/2011 | Merwe et al. |
| 2011/0035494 A1 | 2/2011 | Pandey et al. |
| 2011/0075664 A1 | 3/2011 | Lambeth et al. |
| 2011/0075667 A1 | 3/2011 | Li et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0202920 A1 | 8/2011 | Takase |
| 2011/0205931 A1 | 8/2011 | Zhou et al. |
| 2011/0225207 A1 | 9/2011 | Subramanian et al. |
| 2011/0261825 A1 | 10/2011 | Ichino |
| 2011/0264610 A1 | 10/2011 | Armstrong et al. |
| 2011/0283017 A1 | 11/2011 | Alkhatib et al. |
| 2011/0292939 A1 | 12/2011 | Subramaian et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317703 A1 | 12/2011 | Dunbar et al. |
| 2011/0320577 A1 | 12/2011 | Bhat et al. |
| 2012/0008528 A1 | 1/2012 | Dunbar et al. |
| 2012/0014386 A1 | 1/2012 | Xiong et al. |
| 2012/0014387 A1 | 1/2012 | Dunbar et al. |
| 2012/0017022 A1 | 1/2012 | Corrigan et al. |
| 2012/0079478 A1 | 3/2012 | Galles et al. |
| 2012/0131643 A1 | 5/2012 | Cheriton |
| 2012/0158997 A1 | 6/2012 | Hsu et al. |
| 2012/0182992 A1 | 7/2012 | Cowart et al. |
| 2012/0189009 A1 | 7/2012 | Shekhar et al. |
| 2012/0236734 A1 | 9/2012 | Sampath et al. |
| 2012/0291024 A1 | 11/2012 | Barabash et al. |
| 2012/0307826 A1 | 12/2012 | Matsuoka |
| 2012/0323987 A1 | 12/2012 | Cantu et al. |
| 2013/0007740 A1 | 1/2013 | Kikuchi et al. |
| 2013/0010600 A1 | 1/2013 | Jocha et al. |
| 2013/0016723 A1 | 1/2013 | Arad et al. |
| 2013/0031233 A1 | 1/2013 | Feng et al. |
| 2013/0034094 A1 | 2/2013 | Cardona et al. |
| 2013/0044629 A1 | 2/2013 | Biswas et al. |
| 2013/0044636 A1 | 2/2013 | Koponen et al. |
| 2013/0044641 A1 | 2/2013 | Koponen et al. |
| 2013/0044751 A1 | 2/2013 | Casado et al. |
| 2013/0054761 A1 | 2/2013 | Kempf et al. |
| 2013/0058346 A1 | 3/2013 | Sridharan et al. |
| 2013/0073743 A1 | 3/2013 | Ramasamy et al. |
| 2013/0097345 A1 | 4/2013 | Munoz et al. |
| 2013/0103817 A1 | 4/2013 | Koponen et al. |
| 2013/0121209 A1 | 5/2013 | Padmanabhan et al. |
| 2013/0124750 A1 | 5/2013 | Anumala et al. |
| 2013/0125112 A1 | 5/2013 | Mittal et al. |
| 2013/0136126 A1 | 5/2013 | Wang et al. |
| 2013/0142048 A1 | 6/2013 | Gross, IV et al. |
| 2013/0145002 A1 | 6/2013 | Kannan et al. |
| 2013/0145008 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0151685 A1 | 6/2013 | Bursell |
| 2013/0170490 A1 | 7/2013 | Kreeger et al. |
| 2013/0182574 A1 | 7/2013 | So et al. |
| 2013/0227550 A1 | 8/2013 | Weinstein et al. |
| 2013/0227566 A1 | 8/2013 | Higuchi et al. |

(56) References Cited

U.S. PATENT DOCUMENTS

| | | |
|---|---|---|
| 2013/0266015 A1 | 10/2013 | Qu et al. |
| 2013/0266019 A1 | 10/2013 | Qu et al. |
| 2013/0268588 A1 | 10/2013 | Chang et al. |
| 2013/0297768 A1 | 11/2013 | Singh |
| 2013/0301553 A1 | 11/2013 | Klein |
| 2013/0318219 A1 | 11/2013 | Kancherla |
| 2013/0322453 A1 | 12/2013 | Mian |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0332983 A1 | 12/2013 | Koorevaar et al. |
| 2013/0339544 A1 | 12/2013 | Mithyantha |
| 2014/0006585 A1 | 1/2014 | Dunbar et al. |
| 2014/0019639 A1 | 1/2014 | Ueno |
| 2014/0025779 A1 | 1/2014 | Matsumoto |
| 2014/0036730 A1 | 2/2014 | Nellikar et al. |
| 2014/0036924 A1 | 2/2014 | Christenson |
| 2014/0050091 A1 | 2/2014 | Biswas et al. |
| 2014/0056298 A1 | 2/2014 | Vobbilisetty et al. |
| 2014/0064276 A1 | 3/2014 | Basso et al. |
| 2014/0068602 A1 | 3/2014 | Gember et al. |
| 2014/0092901 A1 | 4/2014 | Kapadia et al. |
| 2014/0092907 A1 | 4/2014 | Sridhar et al. |
| 2014/0112343 A1 | 4/2014 | Lambeth et al. |
| 2014/0115578 A1 | 4/2014 | Cooper et al. |
| 2014/0115584 A1 | 4/2014 | Mudigonda et al. |
| 2014/0123211 A1 | 5/2014 | Wanser et al. |
| 2014/0140244 A1 | 5/2014 | Kapadia et al. |
| 2014/0146817 A1 | 5/2014 | Zhang |
| 2014/0169169 A1 | 6/2014 | Almog et al. |
| 2014/0169215 A1 | 6/2014 | Rajendran et al. |
| 2014/0169222 A1 | 6/2014 | Cohen et al. |
| 2014/0195666 A1 | 7/2014 | Dumitriu et al. |
| 2014/0201733 A1 | 7/2014 | Benny et al. |
| 2014/0207930 A1 | 7/2014 | Benny |
| 2014/0233567 A1 | 8/2014 | Guo et al. |
| 2014/0241247 A1 | 8/2014 | Kempf et al. |
| 2014/0269705 A1 | 9/2014 | DeCusatis et al. |
| 2014/0269709 A1 | 9/2014 | Benny et al. |
| 2014/0280738 A1 | 9/2014 | Kolker et al. |
| 2014/0282889 A1 | 9/2014 | Ishaya et al. |
| 2014/0294005 A1 | 10/2014 | Jain et al. |
| 2014/0328343 A1 | 11/2014 | Kapadia et al. |
| 2014/0334485 A1 | 11/2014 | Jain et al. |
| 2014/0337497 A1 | 11/2014 | Wanser et al. |
| 2014/0337500 A1 | 11/2014 | Lee |
| 2014/0348166 A1 | 11/2014 | Yang et al. |
| 2015/0010001 A1 | 1/2015 | Duda et al. |
| 2015/0043576 A1 | 2/2015 | Dixon et al. |
| 2015/0043581 A1 | 2/2015 | Devireddy et al. |
| 2015/0058470 A1 | 2/2015 | Duda |
| 2015/0058968 A1 | 2/2015 | Wang et al. |
| 2015/0063353 A1 | 3/2015 | Kapadia et al. |
| 2015/0082418 A1 | 3/2015 | Gu |
| 2015/0100681 A1 | 4/2015 | Reese et al. |
| 2015/0103661 A1 | 4/2015 | Shen et al. |
| 2015/0103679 A1 | 4/2015 | Tessmer et al. |
| 2015/0103839 A1 | 4/2015 | Chandrashekhar et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0109923 A1 | 4/2015 | Hwang |
| 2015/0117454 A1 | 4/2015 | Koponen et al. |
| 2015/0124612 A1 | 5/2015 | Schlansker et al. |
| 2015/0124817 A1 | 5/2015 | Merchant et al. |
| 2015/0124821 A1 | 5/2015 | Chu et al. |
| 2015/0124826 A1 | 5/2015 | Edsall et al. |
| 2015/0200954 A1 | 7/2015 | Gourlay et al. |
| 2015/0281042 A1 | 10/2015 | Agarwal et al. |
| 2015/0281048 A1 | 10/2015 | Agarwal et al. |
| 2015/0319009 A1 | 11/2015 | Zhao |
| 2015/0334011 A1 | 11/2015 | Zheng et al. |
| 2015/0372943 A1 | 12/2015 | Hasan et al. |
| 2015/0381641 A1 | 12/2015 | Cabrera et al. |
| 2016/0021032 A1 | 1/2016 | Maier et al. |
| 2016/0057014 A1 | 2/2016 | Thakkar et al. |
| 2016/0094364 A1 | 3/2016 | Subramaniyam et al. |
| 2016/0094365 A1* | 3/2016 | Subramaniyam ... H04L 12/4641 370/401 |
| 2016/0094366 A1 | 3/2016 | Wang et al. |
| 2016/0094396 A1* | 3/2016 | Chandrashekhar ......................... G06F 9/44505 370/254 |
| 2016/0218925 A1 | 7/2016 | Mammen et al. |
| 2016/0226822 A1 | 8/2016 | Zhang et al. |
| 2016/0330045 A1 | 11/2016 | Tang et al. |
| 2017/0005918 A1 | 1/2017 | Agarwal et al. |
| 2017/0005924 A1 | 1/2017 | Agarwal et al. |
| 2017/0005942 A1 | 1/2017 | Agarwal et al. |
| 2017/0141962 A1 | 5/2017 | Britt et al. |
| 2017/0286158 A1 | 10/2017 | Dai et al. |
| 2018/0167316 A1 | 6/2018 | Agarwal et al. |
| 2018/0276013 A1 | 9/2018 | Chandrashekhar et al. |
| 2019/0149357 A1 | 5/2019 | Wang et al. |
| 2019/0149358 A1 | 5/2019 | Sharma et al. |
| 2019/0207817 A1 | 7/2019 | Chandrashekhar et al. |
| 2019/0280972 A1 | 9/2019 | Agarwal et al. |
| 2020/0067730 A1 | 2/2020 | Subramaniyam et al. |
| 2020/0081728 A1 | 3/2020 | Chandrashekhar et al. |
| 2020/0296038 A1 | 9/2020 | Agarwal et al. |

FOREIGN PATENT DOCUMENTS

| | | |
|---|---|---|
| CN | 101808030 A | 8/2010 |
| CN | 101816168 A | 8/2010 |
| CN | 101822006 A | 9/2010 |
| CN | 101953120 A | 1/2011 |
| CN | 102347898 A | 2/2012 |
| CN | 102549983 A | 7/2012 |
| CN | 102571998 A | 7/2012 |
| CN | 102577255 A | 7/2012 |
| CN | 102780601 A | 11/2012 |
| CN | 102801715 A | 11/2012 |
| CN | 103141058 A | 6/2013 |
| CN | 103379010 A | 10/2013 |
| CN | 103491006 A | 1/2014 |
| CN | 103890751 A | 6/2014 |
| CN | 103905283 A | 7/2014 |
| CN | 103957160 A | 7/2014 |
| CN | 104025508 A | 9/2014 |
| EP | 1653688 A1 | 5/2006 |
| EP | 2566129 A1 | 3/2013 |
| EP | 2648370 A1 | 10/2013 |
| JP | 2003069609 A | 3/2003 |
| JP | 2003124976 A | 4/2003 |
| JP | 2003318949 A | 11/2003 |
| JP | 2011171874 A | 9/2011 |
| JP | 2012231382 A | 11/2012 |
| JP | 2013175075 A | 9/2013 |
| JP | 2014230217 A | 12/2014 |
| KR | 20070050864 A | 5/2007 |
| WO | 2005094008 A1 | 10/2005 |
| WO | 2005112390 A1 | 11/2005 |
| WO | 2008095010 A1 | 8/2008 |
| WO | 2009045130 A1 | 4/2009 |
| WO | 2012051884 A1 | 4/2012 |
| WO | 2012093429 A1 | 7/2012 |
| WO | 2013020126 A1 | 2/2013 |
| WO | 2013026049 A1 | 2/2013 |
| WO | 2013063330 A1 | 5/2013 |
| WO | 2013074827 A1 | 5/2013 |
| WO | 2013184846 A1 | 12/2013 |
| WO | 2013185715 A1 | 12/2013 |
| WO | 2015054671 A2 | 4/2015 |
| WO | 2015147942 A1 | 10/2015 |
| WO | 2016053372 A1 | 4/2016 |
| WO | 2016053640 A1 | 4/2016 |
| WO | 2017003957 A1 | 1/2017 |

OTHER PUBLICATIONS

Non-Published Commonly Owned U.S. Appl. No. 16/888,860, filed Jun. 1, 2020, 65 pages, Nicira, Inc.

(56) References Cited

OTHER PUBLICATIONS

Credle, Rufus, et al., "Implementing a VM-Aware Network Using VMready," First Edition—IBM Redbooks, Aug. 2012, 256 pages, International Business Machines Corporation, Armonk, NY.

Non-Published Commonly Owned U.S. Appl. No. 16/680,432, filed Nov. 11, 2019, 113 pages, Nicira, Inc.

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.

Caesar, Matthew, et al., "Design and Implementation of a Routing Control Platform," NSDI '05: 2nd Symposium on Networked Systems Design & Implementation , Apr. 2005, 14 pages, Usenix Association.

Casado, Martin, et al., "Virtualizing the Network Forwarding Plane," Dec. 2010, 6 pages.

Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al., (U.S. Appl. No. 61/514,990), filed Aug. 4, 2011, 31 pages.

Elmeleegy, Khaled, et al., "EtherProxy: Scaling Ethernet by Suppressing Broadcast Traffic," IEEE INFOCOM 2009, Apr. 19, 2009, 9 pages, IEEE.

Kamath, Daya, et al., "Edge Virtual Bridge Proposal," Version 0. Rev. 0.1, Apr. 23, 2010, 72 pages, IEEE.

Koponen, Teemu, et al., "Network Virtualization in Multi-tenant Datacenters," Technical Report TR-2013-001E, Aug. 2013, 22 pages, VMware, Inc., Palo Alto, CA, USA.

Narten, Thomas, et al., "Address Resolution Problems in Large Data Center Networks," Jan. 2013, 17 pages, Internet Engineering Task Force (IETF).

Non-Published Commonly Owned U.S. Appl. No. 16/671,225, filed Nov. 1, 2019, 84 pages, Nicira, Inc.

Nygren, Anders, et al., "OpenFlow Switch Specification v.1.3.4 (Protocol version 0x04)," Mar. 27, 2014, 171 pages, Open Networking Foundation, Palo Alto, USA.

Rosen, E., "Applicability Statement for BGP/MPLS IP Virtual Private Networks (VPNs)," RFC 4365, Feb. 2006, 32 pages, The Internet Society.

Shah, Himanshu, et al., "ARP Broadcast Reduction for Large Data Centers," draft-shah-armd-arp- reduction-02.txt, Oct. 28, 2011, 11 pages, IETF Trust.

Shenker, Scott, et al., "The Future of Networking, and the Past of Protocols," Dec. 2, 2011, 30 pages, USA.

Watsen, Kent, "Conditional Enablement of Configuiation Nodes," Feb. 18, 2013, 8 pages, Internet Engineering Task Force Trust, Reston, USA.

Non-Published Commonly Owned U.S. Appl. No. 17/341,317, filed Jun. 7, 2021, 112 pages, Nicira, Inc.

Non-Published Commonly Owned U.S. Appl. No. 17/361,284, filed Jun. 28, 2021, 65 pages, Nicira, Inc.

\* cited by examiner

SELECTION OF MANAGED FORWARDING ELEMENT FOR BRIDGE SPANNING MULTIPLE DATACENTERS

CLAIM OF BENEFIT TO PRIOR APPLICATIONS

This application is a continuation application of U.S. patent application Ser. No. 15/813,121, filed Nov. 14, 2017, now published as U.S. Patent Publication 2019/0149358. U.S. patent application Ser. No. 15/813,121, now published as U.S. Patent Publication 2019/0149358, is incorporated herein by reference.

BACKGROUND

Bridging is a technique used to connect different L2 networks (e.g., different virtual local area networks (VLANs) or logical switches) without routing when the L2 networks share the same subnet. For instance, a bridge could be used to connect workloads (e.g., virtual machines, physical servers) that connect to a VLAN to workloads that connect to a virtual extensible local area network (VXLAN). The use of such bridges is generally constrained to logical networks that are contained within a single datacenter.

BRIEF SUMMARY

Some embodiments provide a method for implementing a bridge between a logical L2 network (e.g., a logical switch) that spans multiple datacenters and a physical L2 network located in one of the datacenters spanned by the logical network. In some embodiments, a network manager located at one of the datacenters receives the configuration for the bridge (e.g., from an administrator) and provides this configuration to a set of central controllers that manages the multiple datacenters, along with a datacenter identifier that specifies the particular datacenter in which the physical L2 network is located. The set of central controllers stores information about the managed forwarding elements at each of the datacenters managed by the central controllers, including datacenter identifiers. Using this data, the set of central controllers selects one of the managed forwarding elements that is located in the same datacenter as the physical L2 network. In addition, some embodiments also require that the selected managed forwarding element operate in a host machine on which a data compute node (e.g., a virtual machine) that connects to the logical network resides.

The set of central controllers receives the bridge configuration as a 3-tuple in some embodiments, that includes (i) a logical network (e.g., VXLAN) identifier, (ii) a physical network (e.g., VLAN) identifier, and (iii) a datacenter identifier. As noted above, each managed forwarding element (which may be, e.g., virtual switches operating in virtualization software of host machines in the datacenters) has an associated datacenter identifier as well. The set of central controllers stores this managed forwarding element data as well as information indicating on which host machine each of the data compute nodes (DCNs) attached to the logical L2 network resides. Using this information, the set of central controllers can select one of the managed forwarding elements that fits both criteria (i.e., operates in a host machine that is located in the datacenter identified in the 3-tuple, and on which one of the logical network DCNs resides).

The set of central controllers distributes the bridge configuration to the selected managed forwarding element, which implements the bridge for packets sent between the logical L2 network and physical L2 network. The managed forwarding element bridges packets by, e.g., removing a logical network identifier from a packet and adding a physical network identifier (e.g., a VLAN tag), or vice versa.

In certain circumstances, the bridge may need to be implemented in multiple datacenters, either moving from one datacenter to another as a failover mechanism or in a configuration in which the bridge operates simultaneously in multiple datacenters at once (e.g., bridging physical L2 networks in multiple datacenters onto the same logical L2 network). Thus, some embodiments use a generic physical network identifier in the bridge configuration that maps to different specific physical L2 networks at different datacenters. The network managers at two different datacenters receive the same configuration specifying a bridge between a logical L2 network that spans the two datacenters and a physical network identifier. The first network manager (at the first datacenter) maps this physical network identifier to a first physical L2 network (e.g., a VLAN) at the first datacenter while the second network manager (at the second datacenter) maps this physical network identifier to a second physical L2 network at the second datacenter. The network managers, in some embodiments, provide the configurations to the set of central controllers using their respective datacenter identifiers and specific physical L2 network identifiers in order for the central controllers to select managed forwarding elements at the two different datacenters to which to provide the respective bridge configurations.

As mentioned, one such circumstance of some embodiments that uses the generic physical network identifier involves moving the bridge from one datacenter to another. In this scenario, the first network manager initially provides the bridge configuration for the first datacenter (i.e., using the first datacenter identifier and an identifier for a specific physical L2 network located at the first datacenter) to the set of controllers, which configures the bridge on a managed forwarding element in the first datacenter. If the first network manager fails (e.g., the machine on which the first network manager operates fails, loses communication, etc.), some embodiments move the bridge to a second datacenter also spanned by the logical L2 network. This second datacenter may have a physical L2 network that acts as a backup for the physical L2 network at the first datacenter. Thus, the second network manager (at the second datacenter) provides the bridge configuration for the second datacenter (using the second datacenter identifier and an identifier for the specific physical L2 network located at the second datacenter) to the set of controllers, which configures the bridge on a managed forwarding element in the second datacenter.

In an active-active scenario, physical L2 networks at more than one datacenter are bridged onto the logical L2 network at the same time. That is, each of the network managers at their respective datacenters maps the generic physical network identifier to their own specific physical L2 network, and provides their separate configuration to the set of central controllers, which configures bridges at each datacenter. Thus, the same traffic from a logical network DCN (e.g., broadcast or multicast traffic) can be bridged onto multiple physical L2 networks at different datacenters.

Having multiple physical L2 networks at different datacenters bridged onto the same logical network can create the possibility of traffic loops as well as undesired connectivity between the physical L2 networks at different datacenters. For instance, a broadcast packet sent from a DCN on the first datacenter's physical L2 network would be bridged onto the logical network by the bridge at the first datacenter, and (because it is a broadcast packet) would reach the bridge at the second datacenter, which would (at least) bridge the packet onto the physical L2 network at the second datacenter. Thus, as the logical network packets are tunneled between host machines (e.g., using VXLAN, GENEVE, STT, etc.), some embodiments use an available field or portion thereof (e.g., a single bit) in the tunnel encapsulation header to identify that a packet has already been bridged. When the managed forwarding element implementing the bridge receives such a packet, the forwarding element does not bridge the packet again, instead just delivering the packet to its destination (e.g., the logical network DCN residing on that host machine).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for implementing a bridge between a logical L2 network (e.g., a logical switch) that spans multiple datacenters and a physical L2 network located in one of the datacenters spanned by the logical network. In some embodiments, a network manager located at one of the datacenters receives the configuration for the bridge (e.g., from an administrator) and provides this configuration to a set of central controllers that manages the multiple datacenters, along with a datacenter identifier that specifies the particular datacenter in which the physical L2 network is located. The set of central controllers stores information about the managed forwarding elements at each of the datacenters managed by the central controllers, including datacenter identifiers. Using this data, the set of central controllers selects one of the managed forwarding elements that is located in the same datacenter as the physical L2 network. In addition, some embodiments also require that the selected managed forwarding element operate in a host machine on which a data compute node (e.g., a virtual machine) that connects to the logical network resides.

Figure 1:
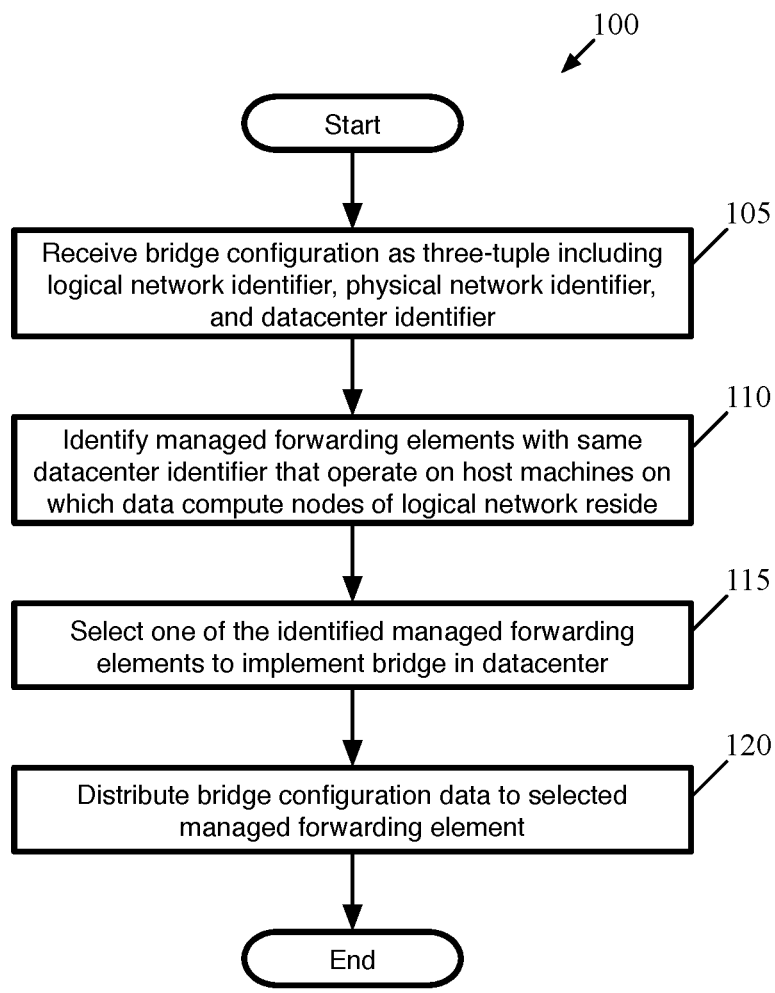
FIG. 1 conceptually illustrates a process of some embodiments to select a managed forwarding element to implement a bridge between a logical network that spans multiple datacenters and a physical network at one of the datacenters.

FIG. 1 conceptually illustrates a process 100 of some embodiments to select a managed forwarding element to implement a bridge between a logical network that spans multiple datacenters and a physical network at one of the datacenters. The process 100 is performed by a set of central controllers in some embodiments.

Figure 2:
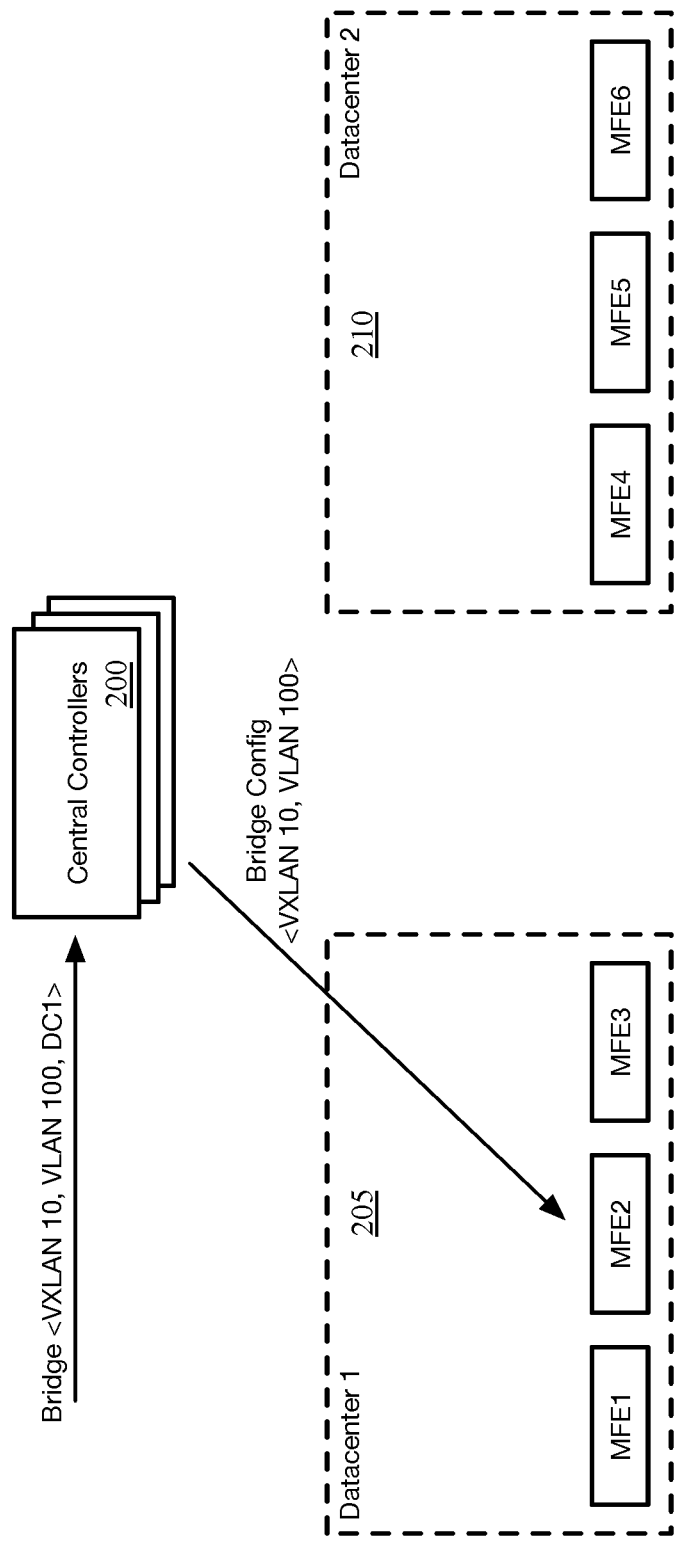
FIG. 2 conceptually illustrates a set of central controllers that receives a bridge configuration, selects a managed forwarding element, and provides the bridge configuration to the selected managed forwarding element.

The process 100 will be described in part by reference to FIGS. 2 and 3. FIG. 2 illustrates a set of central controllers 200, as well as managed forwarding elements (MFEs) operating in two datacenters 205 and 210. The set of central controllers 200 may be a single controller, a cluster of controllers, etc. The controllers may be located, in different embodiments, at one or the other of the datacenters 205 and 210, divided between the datacenters, or located at a different location (e.g., at a datacenter other than these two).

The managed forwarding elements are configurable forwarding elements that receive configuration data distributed by the set of central controllers 200. In some embodiments, the managed forwarding elements are software forwarding elements (e.g., virtual switches, virtual routers, combined switch/router software modules, etc.) that execute within the virtualization software (e.g., hypervisors) of different host machines in the datacenters.

The process 100 begins by receiving (at 105) a bridge configuration as a three-tuple including (i) a logical network identifier, (ii) a physical network identifier, and (iii) a datacenter identifier. In some embodiments, this data is received from a network manager that operates at one of the datacenters (i.e., the datacenter specified by the datacenter identifier). The network manager receives the bridge configuration, e.g., through an application programming interface (API) based on user input to specify a bridge between a logical L2 network and a physical L2 network, and provides the configuration data (with the datacenter identifier) to the set of central controllers. In some embodiments, the network manager maps a generic physical network identifier in the configuration received through the API to a specific physical L2 network at the datacenter. This mapping performed by the network manager is explained in more detail below.

In FIG. 2, the set of central controllers 200 receives a bridge configuration identifying a logical L2 network with the identifier VXLAN 10, a physical L2 network with the identifier VLAN 100, and a datacenter identifier DC1. The logical network identifier, in some embodiments, specifies a particular logical switch (also referred to as a distributed virtual switch), such as a VXLAN network. A logical switch is an abstract of a switch defined by an administrator that logically connects data compute nodes (e.g., VMs, containers, etc.) that may not be connected to the same physical switch. In some embodiments, the data compute nodes connected to a logical switch may be distributed across multiple racks within a datacenter, or even multiple datacenters. When data compute nodes (DCNs) on the same logical switch communicate with each other, they do so as though they are connected to the same physical switch, while the physical network (e.g., the MFEs) between them uses, e.g., tunnel encapsulation to preserve this abstraction.

The physical network identifier, in some embodiments, identifies a VLAN or similar L2 construct that operates within a single datacenter. The physical L2 networks do not use an overlay network to communicate, and are thus confined to a single datacenter. Lastly, the datacenter identifier specifies a particular one of the datacenters that host machines connected to the logical network.

Next, the process 100 identifies (at 110) MFEs that (i) have the same datacenter identifier as the datacenter identifier received as part of the bridge configuration and (ii) operate on host machines on which DCNs of the logical network reside. In some embodiments, each DCN of the logical network directly connects to a managed forwarding element that operates on the same physical host machine as the DCN. In some embodiments, a set of MFEs (e.g., one or more virtual switches, virtual routers, etc.) operates on a physical host machine, and the process identifies MFEs that implement bridges that operate on the same host machine as the DCN. For instance, a virtual router might implement the bridge, while the DCN connects directly to a virtual switch which in turn connects to the virtual router. In the example shown in FIG. 2, each of MFE1, MFE2, and MFE3 would be identified as having the same datacenter identifier as specified by the bridge configuration, but not all of these would necessarily operate on the same physical host as a DCN attached to the logical network VXLAN 10.

The process 100 then selects (at 115) one of the identified MFEs (that meets the above criteria) to implement the bridge in the specified datacenter. Different embodiments may make the selection randomly or pseudo-randomly, using load balancing techniques (i.e., balancing the number of bridges for different logical networks that are implemented on the different MFEs of a datacenter), etc.

Figure 3:
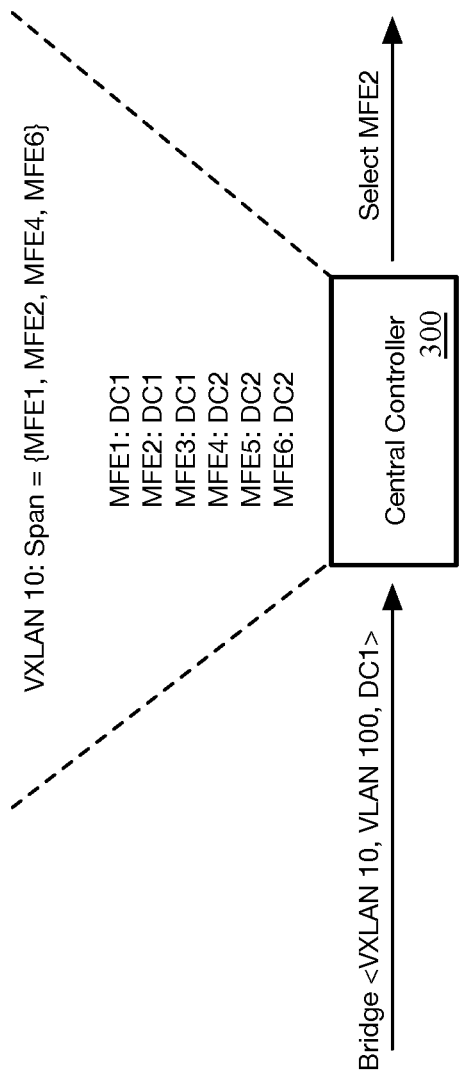
FIG. 3 conceptually illustrates an example of the selection of an MFE for a bridge by a central controller.

FIG. 3 conceptually illustrates an example of the selection of an MFE for a bridge by a central controller 300. As shown, the controller receives a bridge configuration (e.g., from a network manager) for a bridge between logical L2 network VXLAN 10, physical L2 network VLAN 100, in datacenter 1. The central controller 300 stores a mapping of each MFE in datacenters 1 and 2 to their respective datacenter identifier. Thus, the central controller can identify that MFE1, MFE2, and MFE3 have the same datacenter identifier as specified in the bridge configuration. In addition, the central controller stores (or calculates) the span of the logical L2 network VXLAN 10, which includes MFE1, MFE2, MFE4, and MFE 6. These are the MFEs that are configured to implement VXLAN 10, for example because they operate on the same host machine on which DCNs belonging to VXLAN 10 reside. Based on this data, the central controller 300 can select either MFE1 or MFE2, and in this example selects MFE2.

Finally, the process 100 distributes (at 120) bridge configuration data to the selected MFE. The process then ends. In FIG. 2, the set of central controllers 300 selects MFE2, and distributes bridge configuration data to the MFE, instructing the MFE to set up a bridge between VXLAN 10 and VLAN 100. In some embodiments, the set of central controllers actually distributes this information as a data tuple to a local controller operating on the same host as the MFE (e.g., also in the virtualization software of the host machine). The local controller then converts the data tuple into configuration data for the specific type of MFE operating on the host (e.g., flow entries for a flow-based MFE, other types of configuration data for other types of MFEs). In addition, in some embodiments, the set of central controllers distribute to the other MFEs (at least those operating on host machines on which DCNs attached to the logical network reside) the location of the bridge as well as the list of addresses (e.g., MAC addresses) in each of the networks being bridged, so that packets requiring bridging can be identified and sent to MFE2.

Figure 4:
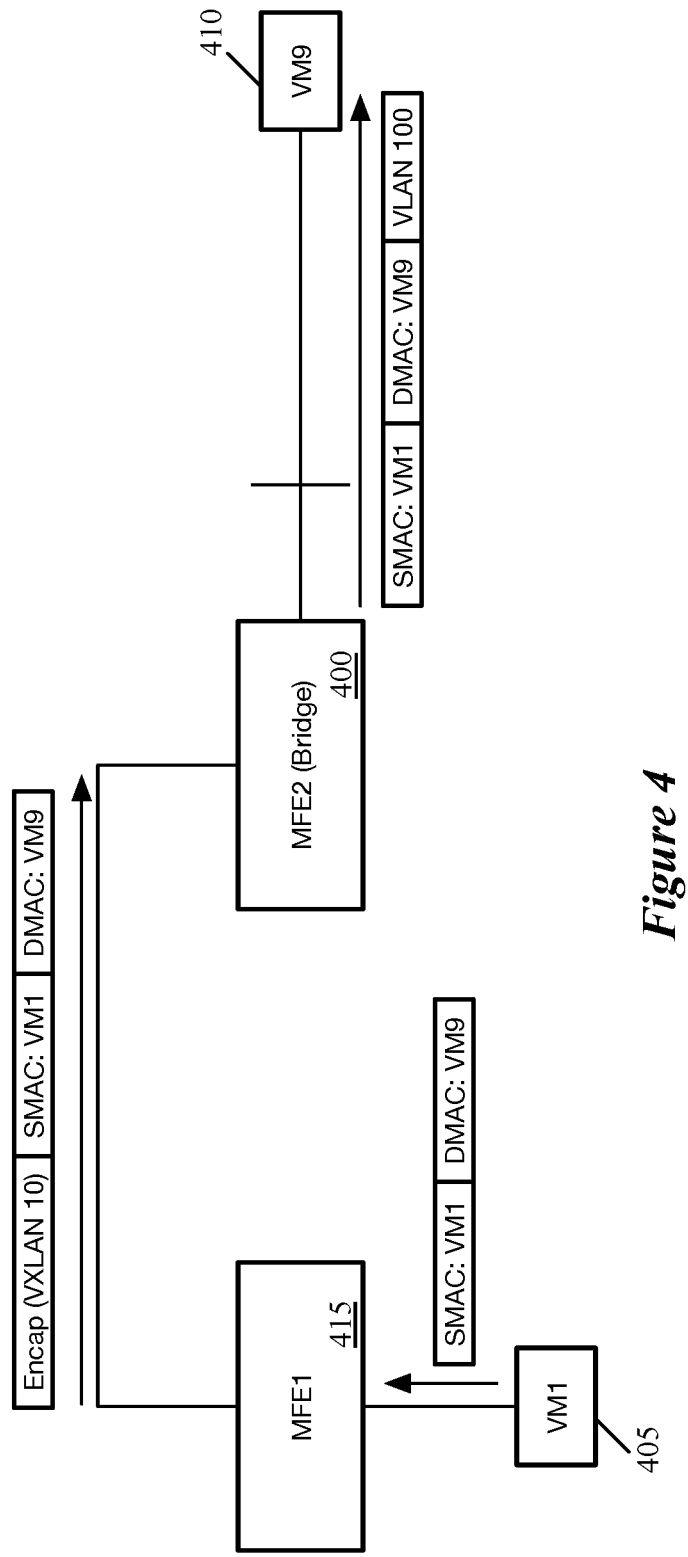
FIG. 4 conceptually illustrates an example of an MFE bridging a packet sent from a first DCN on a logical network to a second DCN on a physical L2 network.

The selected managed forwarding element bridges packets by, e.g., removing a logical network identifier from a packet and adding a physical network identifier (e.g., a VLAN tag), or vice versa. FIG. 4 conceptually illustrates an example of a MFE 400 operating to bridge a packet sent from a first DCN (VM1) on a logical network (VXLAN 10) to a second DCN (VM9) on a physical L2 network (VLAN 100). As shown, the first DCN 405 sends a unicast packet with its own MAC address as the source address and the MAC address of the second DCN 410 as the destination address.

The MFE 415 to which this first DCN connects processes the packet and determines that the packet requires bridging by the bridge MFE 400. As such, the MFE 415 tunnels the packet to the bridge MFE 400, using VXLAN encapsulation (which includes the VXLAN identifier in the outer encapsulation header). The bridge MFE 400 receives this packet, removes the encapsulation, and, based on the destination MAC address, determines that the packet needs to be bridged onto VLAN 100. As such, the bridge MFE 400 adds a VLAN tag (for VLAN 100) to the packet, and sends the packet onto the VLAN (which could involve tunneling the packet to a hardware switch, such as a TOR, that connects to the DCNs on the VLAN).

In the above example, the bridge is configured to operate in a specific datacenter in which the physical L2 network is located. In certain circumstances, the bridge may need to be implemented in multiple datacenters, either moving from one datacenter to another as a failover mechanism or in a configuration in which the bridge operates simultaneously in multiple datacenters at once (e.g., bridging physical L2 networks in multiple datacenters onto the same logical L2 network). Thus, some embodiments use a generic physical network identifier in the bridge configuration that maps to different specific physical L2 networks at different datacenters. The network managers at two different datacenters receive the same configuration specifying a bridge between a logical L2 network that spans the two datacenters and a physical network identifier. The first network manager (at the first datacenter) maps this physical network identifier to a first physical L2 network (e.g., a VLAN) at the first datacenter while the second network manager (at the second datacenter) maps this physical network identifier to a second physical L2 network at the second datacenter. The network managers, in some embodiments, provide the configurations to the set of central controllers using their respective datacenter identifiers and specific physical L2 network identifiers in order for the central controllers to select managed forwarding elements at the two different datacenters to which to provide the respective bridge configurations.

Figure 5:
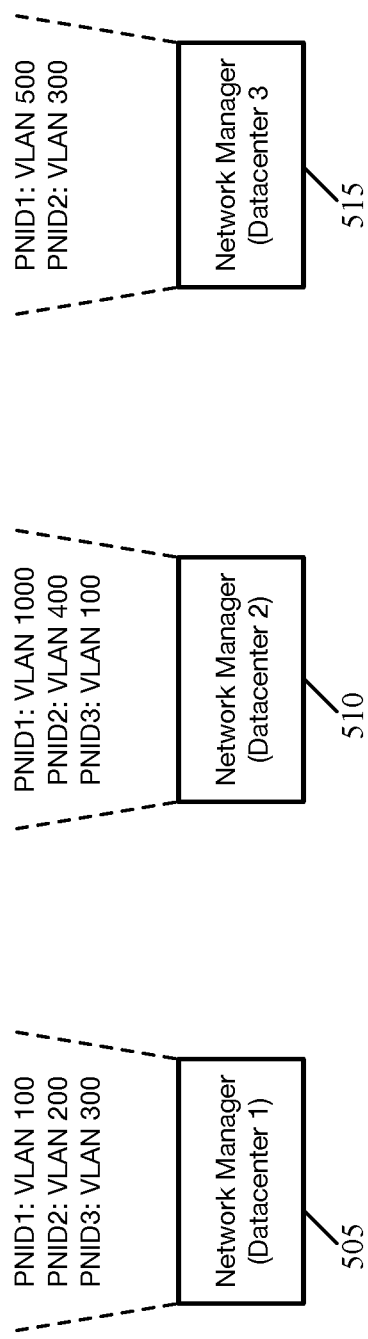
FIG. 5 conceptually illustrates the mapping of some embodiments of generic physical network identifiers to specific physical L2 networks by different network managers.

FIG. 5 conceptually illustrates the mapping of some embodiments of generic physical network identifiers to specific physical L2 networks by different network managers 505-515. As shown, these three network managers 505-515 operate in three different datacenters, and store their own separate mappings of generic physical network identifiers (PNIDs) to specific VLANs at their respective datacenters. Thus, if the first network manager 505 receives a bridge configuration including PNID2, the network manager 505 will map this to VLAN 200, and provide this (along with an identifier for datacenter 1) as part of the 3-tuple sent to the set of central controllers to setup the bridge. If the second network manager 510 receives the same bridge configuration with PNID2, this network manager 510 will map the PNID to its own VLAN 400, and provide this (along with an identifier for datacenter 2) as part of the 3-tuple sent to the set of central controllers to setup the bridge. As can be seen, the second datacenter also has a VLAN 100, though this is associated with PNID3 (which could be for a completely different tenant). In addition, not all of the PNIDs will necessarily map to physical L2 networks in all of the datacenters. In this case, PNID3 does not map to any network in the third datacenter.

Figure 6:
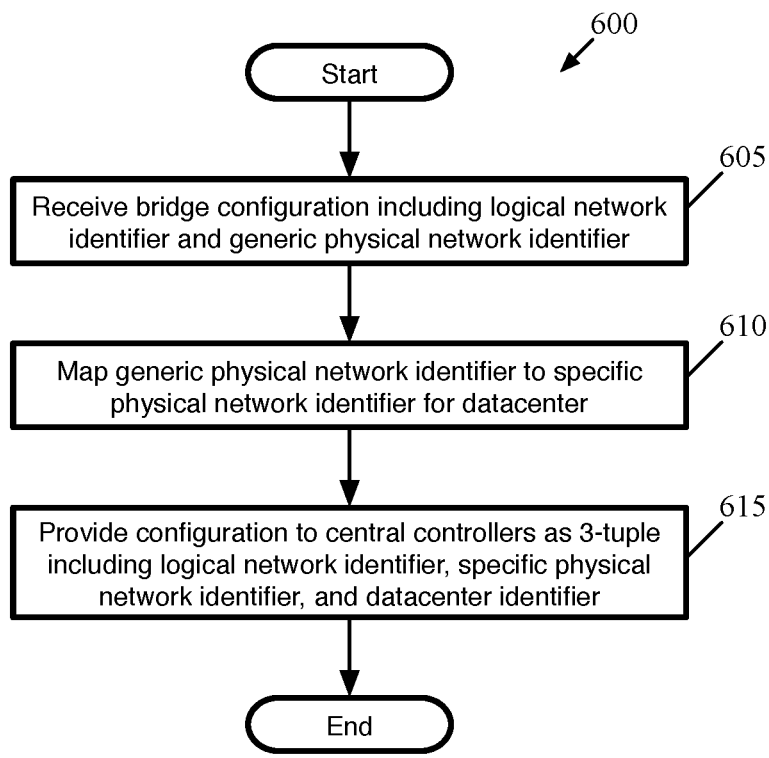
FIG. 6 conceptually illustrates a process of some embodiments for generating a bridge configuration 3-tuple based on a generic physical network identifier.

FIG. 6 conceptually illustrates a process 600 of some embodiments for generating a bridge configuration 3-tuple based on a generic physical network identifier. The process 600 is performed, in some embodiments, by a network manager located at a particular datacenter. The network managers across the various datacenters, in some embodiments, form a management plane. The management plane provides APIs through which administrators (e.g., via cloud management software) provide logical network configuration, to set up logical switches, logical routers, distributed firewalls, bridges between logical switches and physical L2 networks, etc. Among other responsibilities, in some embodiments the management plane translates the configuration from the administrators into the configuration for distribution to the MFEs (or local controllers). The set of central controllers receives this configuration and determines to which MFEs (or local controllers) each piece of configuration data should be distributed (and performs this distribution).

As shown, the process 600 begins by receiving (at 605) a bridge configuration that includes a logical network identifier and a generic physical network identifier. As in the description above, the logical network identifier specifies a logical switch such as a VXLAN network, which in this case spans multiple datacenters. The generic physical network identifier, as mentioned, maps to different specific physical L2 networks at different datacenters.

Next, the process 600 maps (at 610) the generic physical network identifier to a specific physical network identifier for the datacenter. The specific physical network identifier represents a specific VLAN or other physical L2 network at the particular datacenter where the network manager operates, in some embodiments. As shown in FIG. 5, the network manager of some embodiments stores data mapping each generic physical network identifier to its corresponding local specific physical network identifier.

The process 600 then provides (at 615) the bridge configuration to the set of central controllers as a 3-tuple that includes the logical network identifier, the specific physical network identifier (to which the generic physical network identifier was mapped), and a datacenter identifier. As before, the datacenter identifier specifies the datacenter in which the bridge will be located, which is the datacenter of the network manager and the datacenter in which the specific physical L2 network is located. For the same bridge, different network managers will provide different configuration 3-tuples to the set of central controllers (though the logical network identifier will be the same between these 3-tuples).

Figure 7:
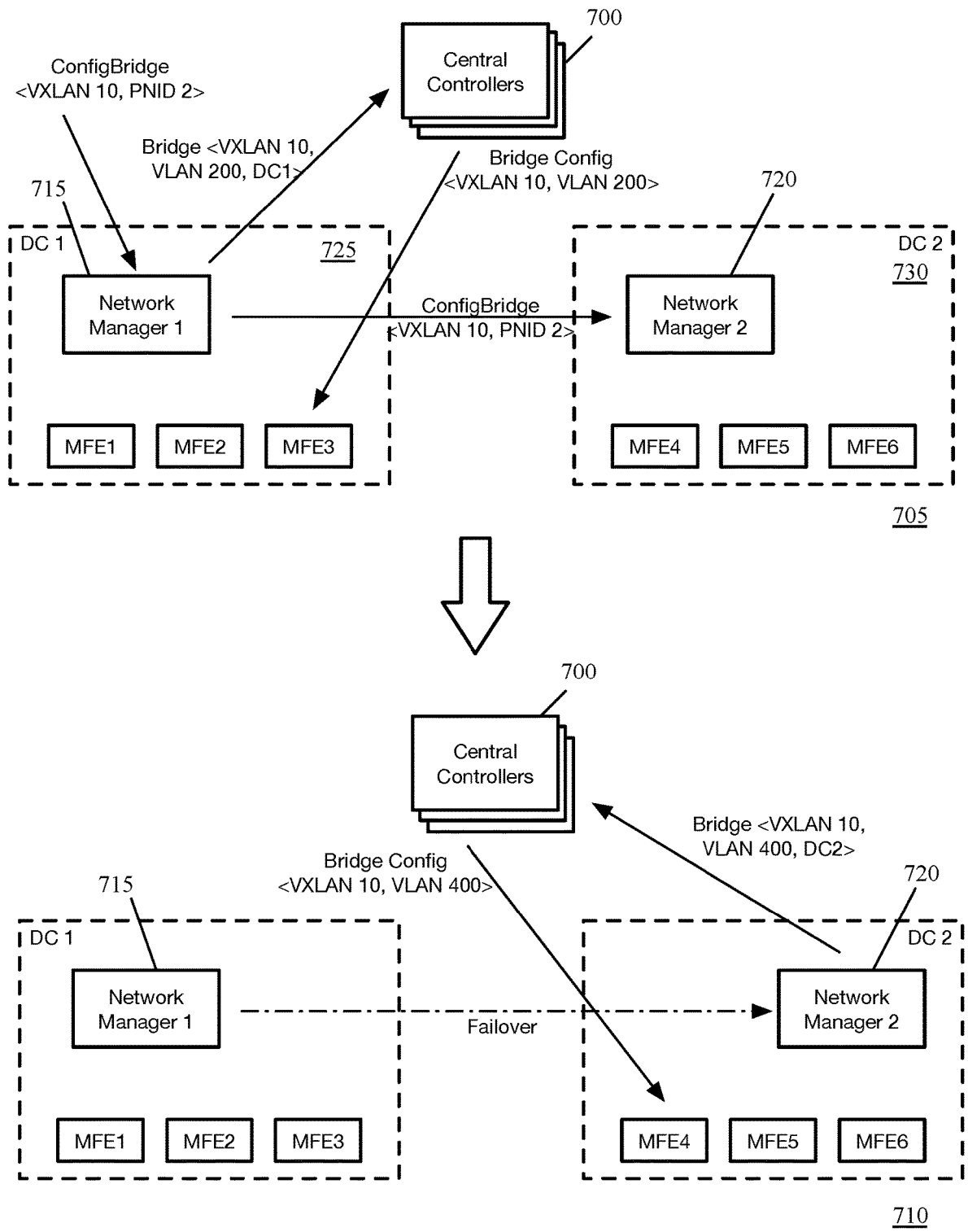
FIG. 7 conceptually illustrates an example of a failover scenario of some embodiments.

As mentioned, one such circumstance of some embodiments that uses the generic physical network identifier involves moving the bridge from one datacenter to another. FIG. 7 conceptually illustrates an example of such a failover scenario of some embodiments over two stages 705 and 710. As shown in the first stage 705, the figure illustrates two network managers 715 and 720 located at two datacenters 725 and 730, respectively. Each of the datacenters 725 and 730 includes three MFEs, and there is a set of central controllers 700 that provides configuration data to the MFEs at both datacenters.

The first stage 705 illustrates the initial setup for a bridge at the first datacenter 705. In this stage, the first network manager 715 initially receives input requesting that a bridge be configured between the logical L2 network VXLAN 10 and the generic physical L2 network represented by PNID 2. The first network manager 715 provides this bridge configuration to the second network manager 720 (as well as the network managers at any other datacenters spanned by the logical L2 network), which does not yet act on this information. In addition, the first network manager 715 maps the PNID to its specific local physical L2 network VLAN 200 and provides the bridge configuration 3-tuple to the set of central controllers 700. This 3-tuple, as shown, specifies VXLAN 10 (the logical network for the bridge), VLAN 200 (the physical network for the bridge at datacenter 1), and the first datacenter 725.

Based on this data, the set of central controllers 700 configures the bridge on a managed forwarding element (MFE3) in the first datacenter 725 (e.g., by providing the configuration data to the local controller that manages this MFE). In addition, in some embodiments, the set of controllers 700 provides configuration data to each of the other MFEs in both datacenters (or at least the MFEs connected to DCNs on the logical network) so that those MFEs send packets requiring bridging to MFE3.

If the first network manager fails (e.g., the machine on which the first network manager operates fails, loses communication, etc.), some embodiments move the bridge to a second datacenter also spanned by the logical L2 network. This second datacenter may have a physical L2 network that acts as a backup for the physical L2 network at the first datacenter.

In the second stage, the network manager 715 fails, and the second network manager 720 is notified of this failure. This notification may occur based on a message sent from the central controllers 700 or elsewhere, or because the second network manager 720 can no longer reach the first network manager 715. The second network manager 720 maps the PNID for the bridge to its specific local physical L2 network VLAN 400 and provides the bridge configuration 3-tuple to the set of central controllers 700. This 3-tuple, as shown, specifies VXLAN 10 (the logical network for the bridge), VLAN 400 (the physical network for the bridge at datacenter 2), and the identifier for the second datacenter 730.

Based on this data, the set of central controllers 700 configures the bridge on a managed forwarding element (MFE4) in the second datacenter 730 (e.g., by providing the configuration data to the local controller that manages this MFE). In addition, in some embodiments, the set of controllers 700 provides configuration data to each of the other MFEs in both datacenters (or at least the MFEs connected to DCNs on the logical network) so that those MFEs send packets requiring bridging to MFE4.

The use of a generic physical network identifier also enables an active-active setup, with bridges operating on multiple datacenters to bridge different physical L2 networks onto the logical L2 network at the same time. To enable this scenario, each of the network managers at their respective datacenters maps the generic physical network identifier to their own specific physical L2 network, and provides their separate configuration to the set of central controllers, which configures bridges at each datacenter. Thus, the same traffic from a logical network DCN (e.g., broadcast or multicast traffic) can be bridged onto multiple physical L2 networks at different datacenters.

Figure 8:
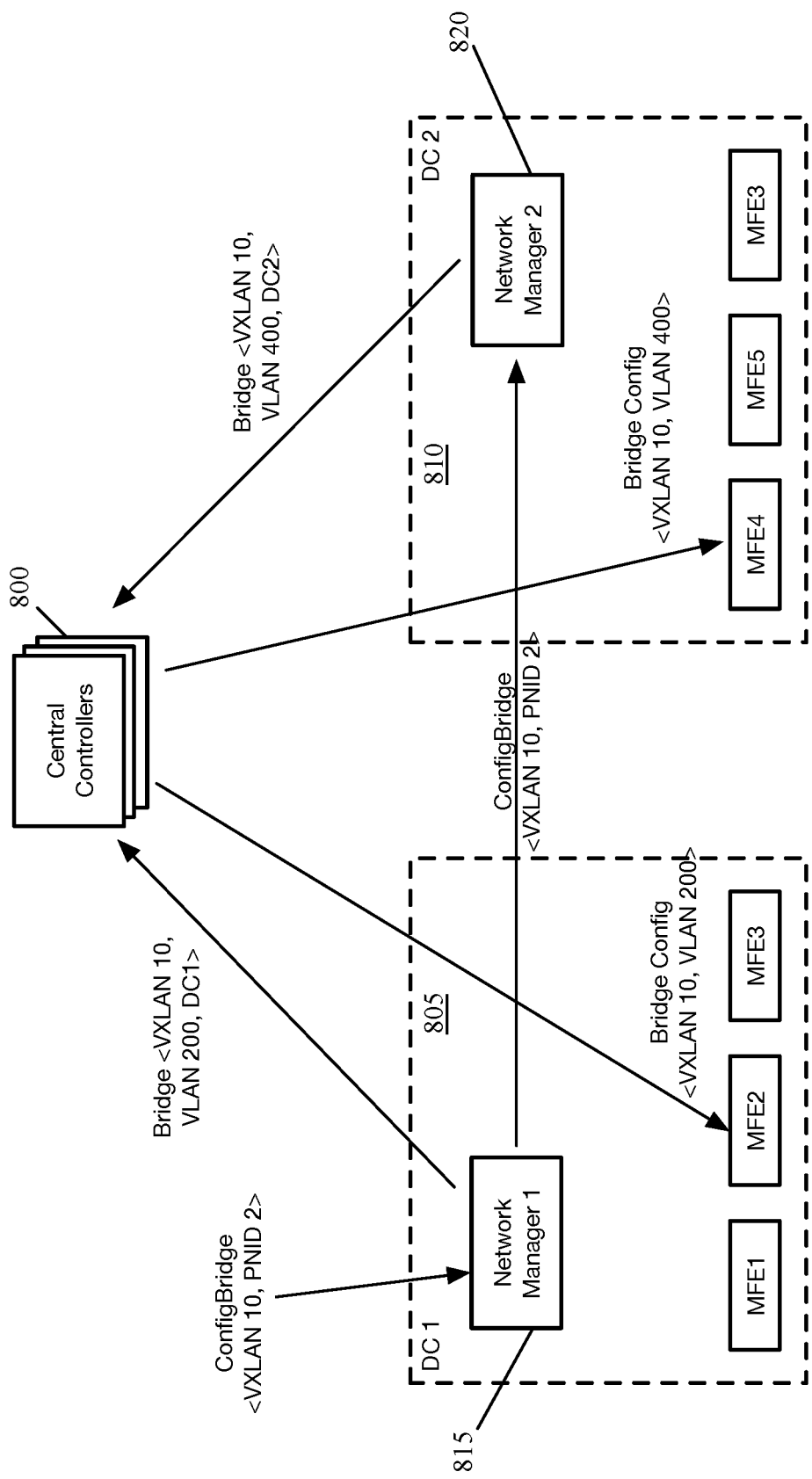
FIG. 8 conceptually illustrates an example of an active-active scenario of some embodiments for a bridge in two datacenters.

FIG. 8 conceptually illustrates an example of such an active-active scenario of some embodiments for a bridge in two datacenters 805 and 810. The figure illustrates two network managers 815 and 820 located at the two datacenters 805 and 810, respectively. Each of the datacenters 805 and 810 includes three MFEs, and the figure additionally illustrates a set of central controllers 800 that provides configuration data to the MFEs at both datacenters.

As shown, the network manager 815 at the first datacenter 805 initially receives input (e.g., through its API) requesting that a bridge be configured between the logical L2 network VXLAN 10 and the generic physical L2 network represented by PNID 2. The first network manager 815 provides this bridge configuration to the second network manager 820 at the second datacenter 810, as well as the network managers at any other datacenters spanned by the logical L2 network VXLAN 10.

Each of these network managers 815 and 820 maps the PNID to its respective specific physical L2 network (VLAN 200 for the first network manager 815 and VLAN 400 for the second network manager 820). In addition, each of the network managers 815 and 820 provides its respective bridge configuration 3-tuple to the set of central controllers 800. As shown, the first network manager 815 sends a 3-tuple specifying VXLAN 10 (the logical network for the bridge), VLAN 200 (the physical network for the bridge at the first datacenter), and the datacenter identifier for the first datacenter 805. The second network manager 820 sends a 3-tuple specifying VXLAN 10 (the same logical network for the bridge), VLAN 400 (the physical network for the bridge at the second datacenter), and the datacenter identifier for the second datacenter 810.

Based on the 3-tuple from the first network manager 815, the set of central controllers 800 selects a managed forwarding element (MFE2) in the first datacenter 805 and configures the bridge on this MFE (e.g., by providing the configuration data to the local controller that manages this MFE). As shown, MFE2 is configured as a bridge between VXLAN 10 and VLAN 200. In addition, based on the 3-tuple from the second network manager 820, the set of central controllers 800 selects a managed forwarding element (MFE4) in the second datacenter 810 and configures the bridge on this MFE (e.g., by providing the configuration data to the local controller that manages this MFE). As shown, MFE4 is configured as a bridge between VXLAN 10 and VLAN 400.

In addition, in some embodiments, the set of controllers provides configuration data to each of the other MFEs in both datacenters (or at least the MFEs connected to DCNs on the logical network) so that these MFEs send packets requiring bridging to MFE2 or MFE4. In some embodiments, an MFE always sends packets requiring bridging to the bridge in its respective datacenter. However, in other embodiments, each of the MFEs receives information about both bridges, so that packets that need to be bridged onto the physical network in the first datacenter can be sent to the bridge in the first datacenter and packets that need to be bridged onto the physical network in the second datacenter can be sent to the bridge in the second datacenter.

Having multiple physical L2 networks at different datacenters bridged onto the same logical network can create the possibility of traffic loops as well as undesired connectivity between the physical L2 networks at different datacenters. In general, the traffic that requires bridging is either unicast traffic from a DCN on the logical L2 network to a DCN on the physical L2 network (or vice versa) or BUM traffic (broadcast, unknown unicast, or multicast) traffic. Unicast traffic will typically not cause loops, and should not cause data packets to be sent from the physical L2 network in one datacenter to the physical L2 network in another datacenter (as those DCNs should not be sending each other traffic in the first place in such embodiments).

However, BUM traffic can create these issues. For instance, a broadcast packet sent from a DCN on the first datacenter's physical L2 network would be bridged onto the logical network by the bridge at the first datacenter, and (because it is a broadcast packet) would reach the bridge at the second datacenter, which would (at least) bridge the packet onto the physical L2 network at the second datacenter. In addition, if a bridge is present at three datacenters, then the first bridge to receive a broadcast packet from its physical L2 network would broadcast this packet to the second and third bridges. In processing the packet, the second bridge would send the packet to the third bridge (possibly avoiding sending the packet back to the first bridge because the packet is not sent out the port on which it was received). The third bridge would also send the packet to the second bridge for the same reason, and both of these bridges would send the packets to the first bridge, creating a loop.

In some embodiments, each time a packet is sent from one of the MFEs to another (including from a bridge in one datacenter to a bridge in another datacenter), the packet is encapsulated (e.g., using VXLAN, GENEVE, STT, etc.). Thus, to prevent traffic loops or having a physical L2 network in one datacenter send traffic to a physical L2 network in another datacenter, some embodiments use an available field or portion thereof (e.g., a single bit) in the tunnel encapsulation header to identify that a packet has already been bridged. When the managed forwarding element implementing the bridge receives such a packet, the forwarding element does not bridge the packet again, instead just delivering the packet to its destination (e.g., the logical network DCN residing on that host machine).

Figure 9:
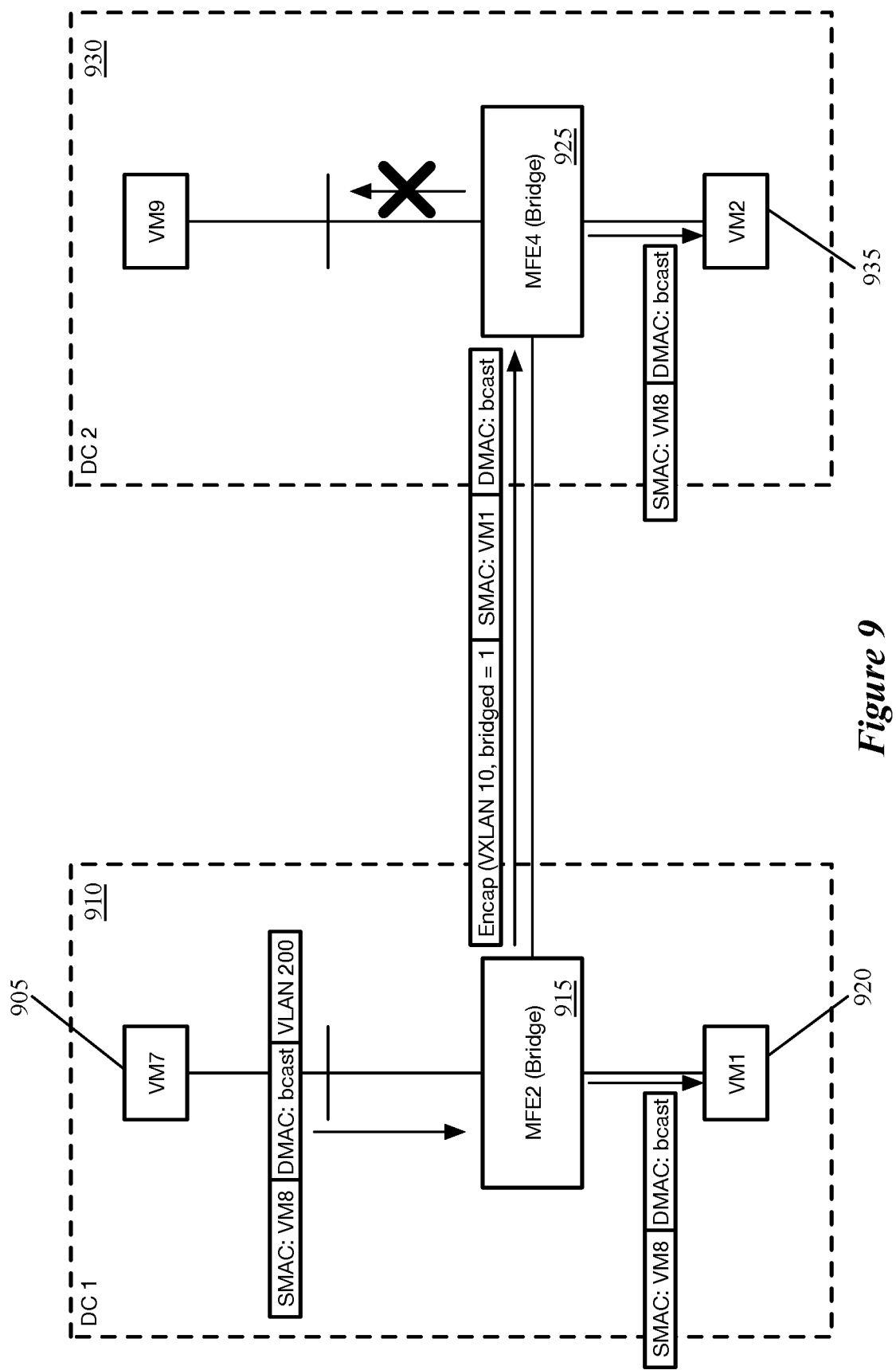
FIG. 9 conceptually illustrates an example of a broadcast packet being sent between bridges in different datacenters.

FIG. 9 conceptually illustrates an example of a broadcast packet being sent between bridges in different datacenters. As shown, the packet is initially sent from a first VM 905 on VLAN 200 in a first datacenter 910 to its local bridge MFE 915. The packet has a source MAC address of the sender VM (VM8) and the broadcast destination address (FFFFFFFFFFFF). The packet also includes a VLAN tag at this point. Though not shown, this packet would be broadcast to the other DCNs on VLAN 200 in the first datacenter as well.

The bridge MFE 915 in the first datacenter 910 receives and processes this packet, bridging the packet to the logical L2 network VXLAN 10. This includes delivering the packet to its local DCN 920 (VM1) that is connected to this logical L2 network, to which the packet is sent (after removing the VLAN tag). The packet is also tunneled to the other MFEs that have VMs on the logical L2 network, including the bridge(s) in other datacenters. In this case, the packet is tunneled to the bridge MFE 925 in the second datacenter 930, in addition to various other MFEs (not shown) in both the first and second datacenters. The encapsulation, as shown, includes the identifier for VXLAN 10, the source and destination IP addresses of tunnel endpoints at the two MFEs, as well as a bridged bit set to 1. This bridged bit identifies the packet as having been bridged, so that the MFE4 will not bridge the packet again.

The bridge MFE 925 receives the packet from the bridge MFE 915 and processes this packet. The MFE 925 delivers the packet to the VM 935, which is on the logical L2 network VXLAN 10. However, because the bridged bit is set in the packet, the MFE 925 does not send the packet out onto its local physical L2 network (and thus VM 940 does not receive the packet), as shown by the crossed-out arrow.

Figure 10:
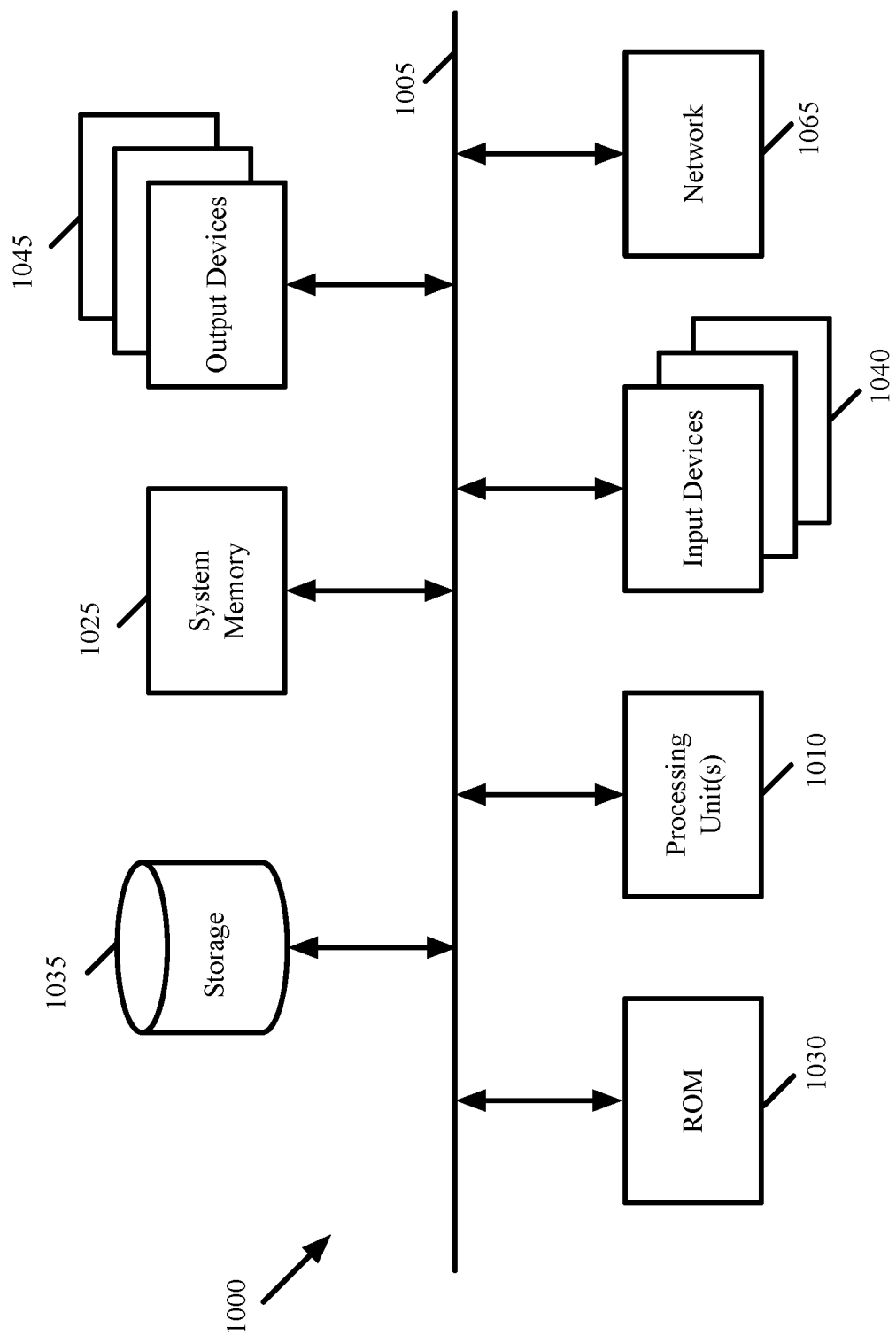
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random-access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 1 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a set of central controllers that manages forwarding elements operating in a plurality of datacenters, a method comprising:
receiving a configuration for a bridge between (i) a logical L2 network that spans at least two datacenters and (ii) a physical L2 network, wherein the configuration specifies a particular one of the datacenters for implementation of the bridge by using a particular datacenter identifier that corresponds to the particular datacenter, the particular datacenter identifier one of a plurality of datacenter identifiers corresponding to the plurality of datacenters;
using a stored mapping of managed forwarding elements to the plurality of datacenter identifiers to identify a plurality of managed forwarding elements that implement the logical L2 network and are operating in the particular datacenter;
selecting one of the identified managed forwarding elements mapped to the particular datacenter identifier to implement the bridge in the particular datacenter; and
distributing bridge configuration data to the selected managed forwarding element.

2. The method of claim 1, wherein the configuration is received from a network manager located at the particular datacenter.

3. The method of claim 1, wherein the logical L2 network is a virtual extensible local area network (VXLAN) and the physical L2 network is a virtual local area network (VLAN) located at the particular datacenter.

4. The method of claim 3, wherein machines connected to the VLAN comprise virtual machines operating on host machines that are not VXLAN-compatible.

5. The method of claim 1, wherein the identified managed forwarding elements operate in virtualization software of host machines located in the particular datacenter, wherein data compute nodes that logically connect to the logical L2 network operate on the host machines.

6. The method of claim 1, wherein the selected managed forwarding element uses the bridge configuration to (i) bridge data packets sent from a first set of data compute nodes that are connected to the logical L2 network and execute in at least two of the plurality of datacenters to destinations in the physical L2 network and (ii) bridge data packets sent from sources in the physical L2 network to a second set of DCNs that are connected to the logical L2 network and execute in at least two of the plurality of datacenters.

7. The method of claim 6, wherein to bridge a data packet sent from a data compute node connected to the logical L2 network to a destination in the physical L2 network, the selected managed forwarding element (i) receives a data packet sent by a data compute node connected to the logical L2 network, the data packet having a destination address of a data compute node connected to the physical L2 network, (ii) removes a logical network identifier from the data packet, and (iii) adds a physical network identifier to the data packet.

8. The method of claim 6, wherein to bridge a data packet sent from a source in the physical L2 network to a DCN connected to the logical L2 network, the selected managed forwarding element (i) receives a data packet sent by a data compute node connected to the physical L2 network, the data packet having a destination address of a data compute node connected to the logical L2 network, (ii) removes a physical network identifier from the data packet, and (iii) adds a logical network identifier to the data packet.

9. A non-transitory machine readable medium storing a central controller application which when executed by at least one processing unit manages forwarding elements operating in a plurality of datacenter, the central controller application comprising sets of instructions for:
receiving a configuration for a bridge between (i) a logical L2 network that spans at least two datacenters and (ii) a physical L2 network, wherein the configuration specifies a particular one of the datacenters for implementation of the bridge by using a particular datacenter identifier that corresponds to the particular datacenter, the particular datacenter identifier is one of a plurality of datacenter identifiers corresponding to the plurality of datacenters, and a plurality of data compute nodes (DCNs) logically connect to the logical L2 network;

using a stored mapping of managed forwarding elements to the plurality of datacenter identifiers to identify a plurality of managed forwarding elements that implement the logical L2 network and are operating in the particular datacenter on host computers on which at least one DCN logically connected to the logical L2 network also operates;

selecting one of the identified managed forwarding elements mapped to the particular datacenter identifier to implement the bridge in the particular datacenter, wherein at least one DCN logically connected to the logical L2 network operates on the same host computer as the selected managed forwarding element; and distributing bridge configuration data to the selected managed forwarding element.

10. The non-transitory machine readable medium of claim 9, wherein the configuration is received from a network manager located at the particular datacenter.

11. The non-transitory machine readable medium of claim 9, wherein the logical L2 network is a virtual extensible local area network (VXLAN) and the physical L2 network is a virtual local area network located at the particular datacenter.

12. The non-transitory machine readable medium of claim 11, wherein DCNs connected to the VLAN comprise virtual machines operating on host machines that are not VXLAN-compatible.

13. The non-transitory machine readable medium of claim 9, wherein the identified managed forwarding elements operate in virtualization software of host machines located in the particular datacenter, wherein data compute nodes that logically connect to the logical L2 network operate on the virtualization software of the host machines.

14. The non-transitory machine readable medium of claim 9, wherein the selected managed forwarding element uses the bridge configuration to (i) bridge data packets sent from a first set of data compute nodes that are connected to the logical L2 network and execute in at least two of the plurality of datacenters to destinations in the physical L2 network and (ii) bridge data packets sent from sources in the physical L2 network to a second set of DCNs that are connected to the logical L2 network and execute in at least two of the plurality of datacenters.

15. The non-transitory machine readable medium of claim 14, wherein to bridge a data packet sent from a data compute node connected to the logical L2 network to a destination in the physical L2 network, the selected managed forwarding element (i) receives a data packet sent by a data compute node connected to the logical L2 network, the data packet having a destination address of a data compute node connected to the physical L2 network, (ii) removes a logical network identifier from the data packet, and (iii) adds a physical network identifier to the data packet.

16. The non-transitory machine readable medium of claim 14, wherein to bridge a data packet sent from a source in the physical L2 network to a DCN connected to the logical L2 network, the selected managed forwarding element (i) receives a data packet sent by a data compute node connected to the physical L2 network, the data packet having a destination address of a data compute node connected to the logical L2 network, (ii) removes a physical network identifier from the data packet, and (iii) adds a logical network identifier to the data packet.

* * * * *